(12) United States Patent
Yen et al.

(10) Patent No.: US 8,629,620 B2
(45) Date of Patent: Jan. 14, 2014

(54) AUTOMATIC LIGHTING CONTROL DEVICE AND SYSTEM

(76) Inventors: Masaaki Yen, Tokyo (JP); Manabu Yen, Tokyo (JP)

(*) Notice: Subject to any disclaimer, the term of this patent is extended or adjusted under 35 U.S.C. 154(b) by 205 days.

(21) Appl. No.: 13/379,023

(22) PCT Filed: Jun. 18, 2010

(86) PCT No.: PCT/JP2010/060327
§ 371 (c)(1),
(2), (4) Date: Dec. 18, 2011

(87) PCT Pub. No.: WO2010/150701
PCT Pub. Date: Dec. 29, 2010

(65) Prior Publication Data
US 2012/0098440 A1    Apr. 26, 2012

(30) Foreign Application Priority Data
Jun. 23, 2009    (JP) .................................. 2009-148576

(51) Int. Cl.
*H05B 37/02* (2006.01)
(52) U.S. Cl.
USPC ........................... 315/159; 315/150; 315/158
(58) Field of Classification Search
USPC .................................. 315/149–151, 155–159
See application file for complete search history.

(56) References Cited

U.S. PATENT DOCUMENTS

| | | | | |
|---|---|---|---|---|
| 6,160,352 A * | 12/2000 | Steinel | ......................... | 315/156 |
| 7,919,935 B2 * | 4/2011 | Rudiger et al. | ............... | 315/307 |
| 8,227,731 B2 * | 7/2012 | Hick et al. | ..................... | 250/205 |
| 2010/0295454 A1 * | 11/2010 | Reed | ............................. | 315/152 |
| 2011/0006690 A1 * | 1/2011 | Hoffman et al. | ............... | 315/150 |

* cited by examiner

*Primary Examiner* — James H Cho
(74) *Attorney, Agent, or Firm* — patenttm.us

(57) ABSTRACT

Provided is an automatic lighting control device for automatically switching on and off a lamp installed within a building in accordance with only the variation of brightness at the installation location. The automatic lighting control device is constituted as follows. A photoelectric transducer 1 has a daylight detection field that overlaps at least partially a lamp illumination field. A first comparator 2 generates a turn-on signal when the output level of the photoelectric transducer 1 becomes lower than the predetermined light-up level. A memory 5 stores the output level of the photoelectric transducer 1 after light-up. A second comparator 8 compares the output level of the photoelectric transducer 1 with the output level stored in the memory 5 after light-up and it generates a turn-off signal when the output level of the photoelectric transducer 1 becomes higher than the stored post-light-up brightness level.

2 Claims, 3 Drawing Sheets

AUTOMATIC LIGHTING CONTROL DEVICE AND SYSTEM

TECHNICAL FIELD

The present invention relates to an automatic lighting control device for switching on and off automatically a lamp installed where the daylight (sunlight) brightness varies. Especially, the control device is used so that the photoelectric transducer for detecting brightness is mounted inside or near the light fixture.

BACKGROUND ART

Conventionally used is an automatic lighting control device for switching the lamp on when daylight darkens and switching the lamp off when daylight comes back bright by means of furnishing a lamp such as a fluorescent lamp with a photoelectric transducer for detecting daylight brightness.

Consider the case where an automatic lighting control device and a lamp are installed so that the detection field of the photoelectric transducer in the automatic lighting control device overlaps the lamp illumination field entirely or partially. The lamp is switched on when daylight darkens. Then, the light of the switched-on lamp also enters into the photoelectric transducer. The total intensity of the incident light increases. Therefore, the lamp is switched off. This turn-off causes weakening of brightness and the lamp is switched on again. Thus, blink operation is repeated.

Therefore, in the following patent document 1, there is proposed an equipment with an automatic lighting control device installed inside or near the lamp. It switches the lamp on when daylight darkens and it switches the lamp off with a timer when given time passed.

Also, in the following patent document 2, there is already proposed to equip a hood for preventing the incident light to the photoelectric transducer from a lamp. And also, in the following patent document 3, there is already proposed to equip a means for adjusting the detection field of the photoelectric transducer for detecting the brightness.

In the following patent document 4, there is already proposed an automatic lighting control device constituted as follows. Installing a Schmidt trigger circuit able to set up the brightness levels corresponding to light-up and light-out, the lamp is switched on when the output level of the photoelectric transducer for detecting the brightness becomes below the preset light-up level. The lamp is switched off when the output level of the photoelectric transducer rises over the preset light-out level. The difference between the light-up level and the light-out level, i.e., the hysteresis value, is set up greatly. The lamp is made to switch on when the output level falls lower than the light-up level. Thus the lamp is not switched out even if the lamp brightness is superposed.

PRIOR ART DOCUMENTS

Patent Documents

Patent document 1: JP2001-307889(A)
Patent document 2: JP2004-311045(A)
Patent document 3: JP9-145472(A)
Patent document 4: JP56-007380(B)

OUTLINE OF THE INVENTION

Problems to be Solved by the Invention

In the conventional automatic lighting control device as mentioned above, it is devised so that only the daylight is incident to the photoelectric transducer for detecting brightness, and the light irradiated from the lamp should not enter to the transducer.

And, as shown in the above patent document 4, if the hysteresis value is set up largely, the lamp cannot be switched off until daylight becomes quite bright. Then, electric power will be wasted.

As mentioned above, there is not yet found an automatic lighting control device for switching on and off automatically the lamp installed inside a building or outdoors in accordance with only the variation of brightness at the installation location.

Means to Solve the Problems

In order to solve the above-mentioned problems, the automatic lighting control device of the present invention is constituted as follows. The automatic lighting control device is comprised of a photoelectric transducer, the first comparator, a memory and the second comparator. The photoelectric transducer's detection field for daylight overlaps the lamp illumination field partially or entirely. The first comparator generates a turn-on signal when the photoelectric transducer gives rise to an output signal lower than the preset light-up level. The memory stores the data indicating the output signal level from the photoelectric transducer of post-light-up. The second comparator compares the output signal level of the photoelectric transducer with the post-light-up level data stored in the memory. The second comparator generates a turn-off signal when the output signal level of the photoelectric transducer exceeds the stored post-light-up level.

The automatic lighting control system of the present invention operates as follows. The output signal level of the photoelectric transducer is compared with the preset light-up level. The photoelectric transducer has a detection field for daylight that overlaps the lamp illumination field partially or entirely. When the photoelectric transducer gives rise to an output signal lower than the preset light-up level, the lamp is switched on. The memory stores the data indicating the post-light-up level of the photoelectric transducer output signal. The output signal level of the photoelectric transducer is compared with the post-light-up level data stored in the memory. The lamp is switched off when the output signal level of the photoelectric transducer exceeds the stored post-light-up level.

Advantageous Effects of the Invention

According to the automatic lighting control device of the present invention, the lamp installed within a building or outdoors can be automatically switched on and off in accordance with only the variation of brightness at the installation location. Lighting can be controlled for each lamp according to the brightness in the illumination field of each lamp when many lamps in a large room or passage.

Therefore, when daylight darkens, the lamp is switched on one by one from the lamp on the place where the lamp is necessary to light. When daylight returns bright, the lamp is switched off one by one from the lamp on the place where the lamp is unnecessary to light. Thus, the electric power can be saved effectively.

PREFERABLE EMBODIMENTS OF THE INVENTION

Figure 3:
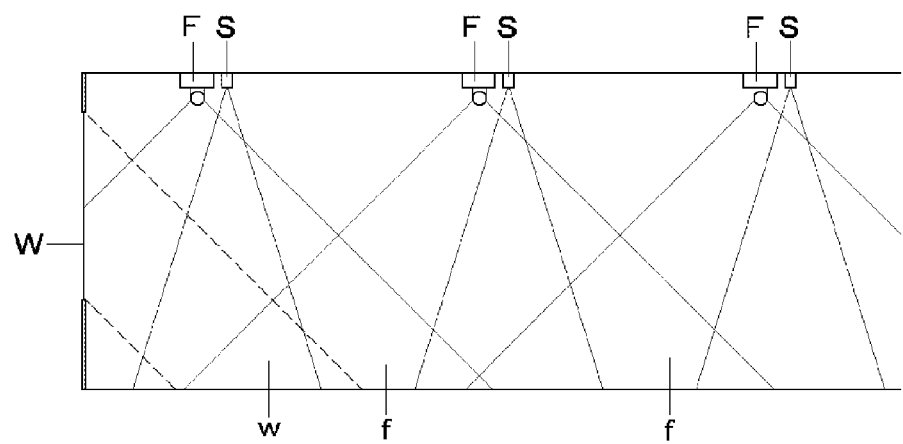
[FIG. 3] shows a diagram for indicating the state that the automatic lighting control device of this invention is installed in a room with a window.

As shown in FIG. 3, the automatic lighting control device S of this invention is a device for attaching to a lamp itself or for mounting on the ceiling or wall of the room. It comprises a photoelectric transducer such as phototransistor or solar cell for detecting the brightness of the incident daylight w from the room window W and the brightness f of the lamp F. That is, the detection field of the photoelectric transducer includes at least a part of the illumination field of the lamp F.

The brightness of daylight w does not change suddenly. It becomes dark gently and becomes bright gently. Therefore, the photoelectric transducer generates direct-current voltage proportional to the incident light intensity as shown in FIG. 2(a) if only the brightness of daylight w is detected when a photoelectric transducer detects the brightness of the room. However, if daylight w is intercepted and the lamp F is switched on, the photoelectric transducer generates the signal voltages as shown in FIG. 2(b). However, like filament-bulb type fluorescent lamps or mercury lamps, such lamps are also used that take much time before reaching rated luminance because luminance rises slowly until the mercury gas pressure rises enough after voltage application.

When the lamp F is switched on where incident daylight w exists, the photoelectric transducer generates the electric signal corresponding to the sum brightness of two lights as shown in FIG. 2(c) because the lamp brightness f overlaps the brightness of daylight w.

(The First Embodiment)

Figure 1:
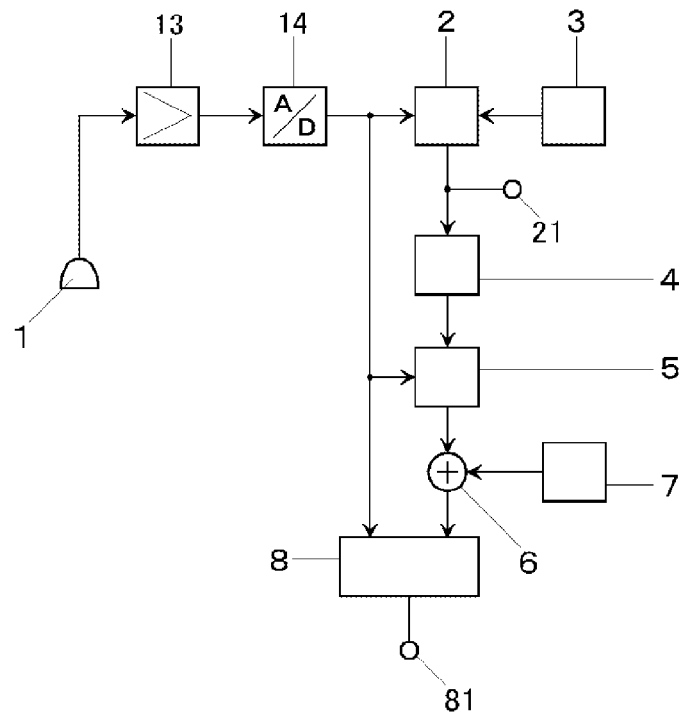
[FIG. 1] shows a block diagram of the first embodiment of the automatic lighting control device of this invention.

As shown in FIG. 1, the automatic lighting control device S of this invention comprises an amplifier 13 for amplifying the output signal of the photoelectric transducer 1 and AD converter 14 for converting the amplified output signal from the photoelectric transducer 1 into digital signal.

The digital output of this AD converter 14 is connected to the first memory 5 for storing digital data, the first input terminal of the first comparator 2 and the first input terminal of the second comparator 8.

To the second input terminal of the first comparator 2, there is connected the second memory 3 storing the digital data corresponding to the brightness requiring lamp illumination. The first comparator 2 compares the digital data stored in this second memory 3 with the digital output data from the AD converter 14. When the digital output data from the AD converter 14 falls below the digital data of the second memory 3 (at t1 in FIG. 2), the first comparator 2 generates the turn-on signal out of the output terminal 21 to switch the lamp on.

This turn-on signal is also applied to the timer 4. When a given time (1 minute, e.g.) passed after generating the turn-on signal, a time-limit signal out of the timer 4 is applied to the write-enable terminal of the first memory 5. The first memory 5 stores the digital output data from the AD converter 14 at the rising edge (t2 in FIG. 2) of the time-limit signal. And also, the first memory 5 continues to yield that digital data.

The adder 6 adds the hysteresis value (h in FIG. 2) stored in the third memory 7 to the digital output data from the first memory 5.

The second comparator 8 compares the digital output data from the AD converter 14 with the digital sum data of the data in the first memory 5 and the hysteresis value.

After the daylight w becomes bright, when the digital output data from the AD converter 14 surpasses the digital sum data of the data in the first memory 5 and the hysteresis value (at t5 in FIG. 2), the output terminal 81 yields the turn-off signal to switch off the lamp.

The digital data stored in the second memory 3 is never changed after the setup at the installation. That digital data may be set semi-variable using DIP switch and so on. The hysteresis value h is the value to be set at manufacturing and it is never changed.

Figure 2:
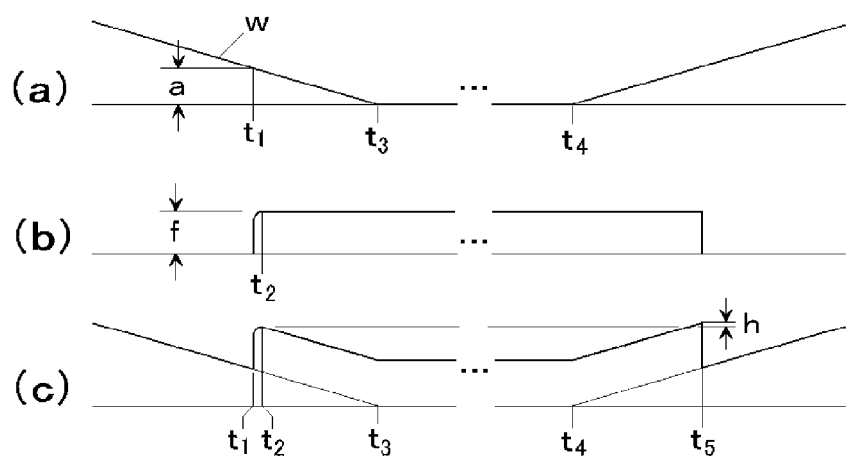
[FIG. 2] shows operation explanatory diagram for explaining the operation of the first embodiment.

Next, based upon the operation diagram of FIG. 2, the lighting operation is explained more particularly.

When daylight w becomes dark near sunset, the level of the digital data through the AD converter from the photoelectric transducer 1 falls gradually as shown in FIG. 2(a). And at the time (t1) when this level falls below the level a of the digital data stored in the second memory 3, a turn-on signal is generated at the output terminal 21 of the first comparator 2 to switch the lamp on.

The lamps like filament-bulb type fluorescent lamps are sometimes used. Such lamps take a long time until reaching the rated luminance because the lamp luminance rises slowly until the mercury gas pressure goes up enough after switch-on. Therefore, using a timer 4, the first memory 5 stores the digital data corresponding to the sum brightness of the brightness of the daylight w and lamp brightness f at the time (t2 in FIG. 2) after reaching the rated luminance.

Then, only the lamp brightness f is rest where no incident daylight exists. When daylight w comes back bright in the morning (at t4 in FIG. 2), the brightness of the daylight w begins to overlap the lamp brightness f. When the digital output data from the AD converter 14 surpasses the digital sum data of the data in the memory 5 collected at light-up and the hysteresis value (h in FIG. 2) (at t5 in FIG. 2), the second comparator 8 generates the turn-off signal at the output terminal 81 to switch the lamp off.

(The Second Embodiment)

The automatic lighting control device of the first embodiment as explained above consists of electronic circuits. The same operation can be performed with a one-chip microcomputer.

Figure 4:
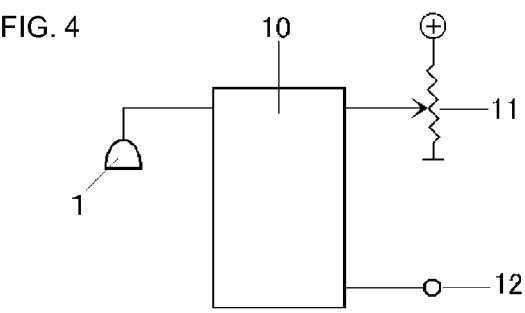
[FIG. 4] shows a block diagram of the second embodiment of the automatic lighting control device the present invention.

As shown in the block diagram of FIG. 4, the one-chip microcomputer 10 with an AD converter is used. The input terminal of this one-chip microcomputer 10 is connected to a photoelectric transducer 1 and a potentiometer 11 which is set up based upon the brightness corresponding to the light-up. The one-chip microcomputer 10 generates the lighting signal at the output terminal 12 to switch the lamp on and off.

Figure 5:
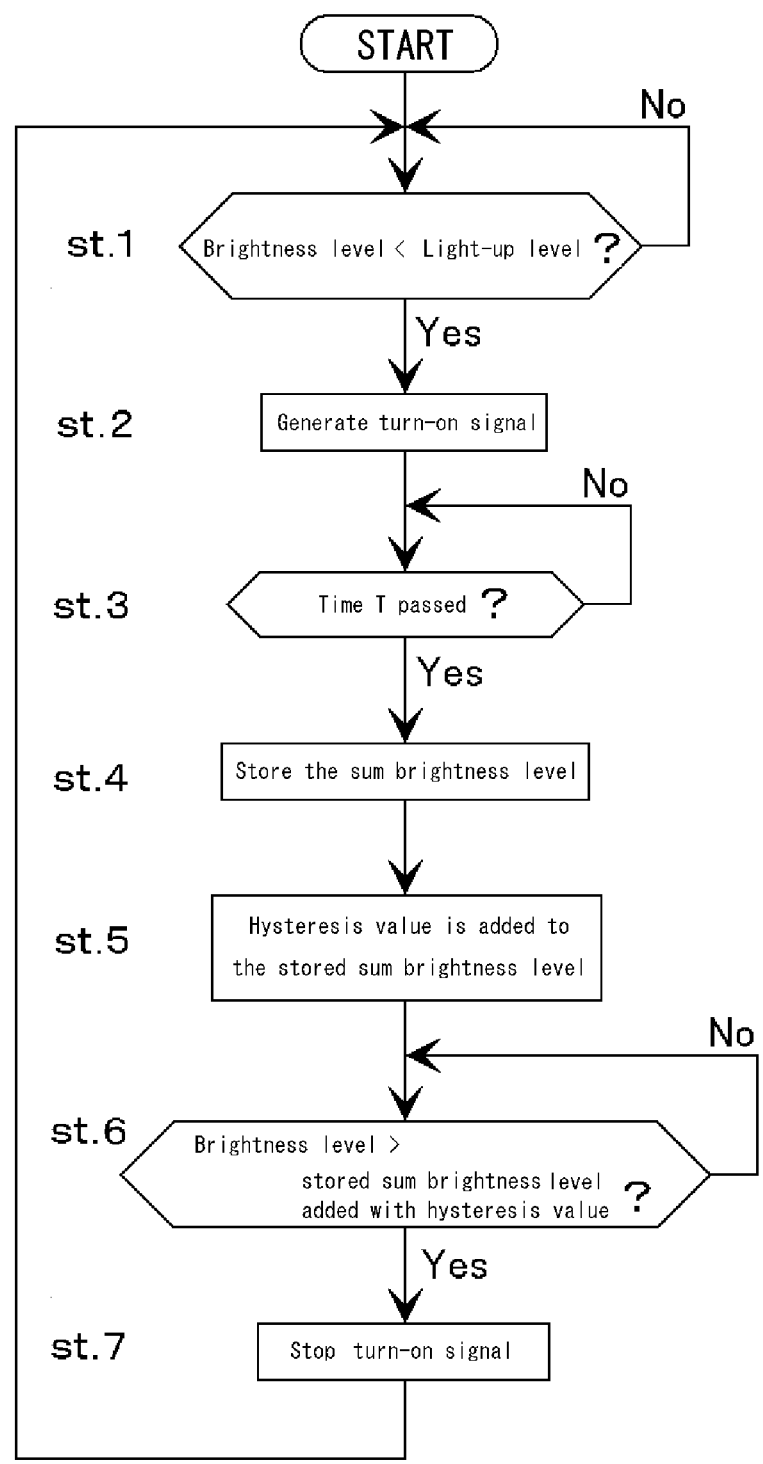
[FIG. 5] shows a flow chart explaining the operation of the automatic lighting control device of the second embodiment.

Next, the lighting operation of the lamp is explained based upon the flow chart of FIG. 5.

(Step 1) The output level (brightness level) corresponding to the daylight brightness detected with the photoelectric transducer 1 is compared with the light-up level set up in the potentiometer 11.

(Step 2) When the output level of the photoelectric transducer 1 lowers below the light-up level, the turn-on signal is generated to switch the lamp on.

(Step 3) It waits for time to pass until the lamp reaches the rated luminance.

(Step 4) The memory stores the output level (brightness level) of the photoelectric transducer 1 corresponding to the sum brightness of daylight and the lamp.

(Step 5) The hysteresis value is added to the brightness level data stored in the memory at Step 4.

(Step 6) The output level data of the photoelectric transducer 1 is compared with the sum brightness level data added with hysteresis value at Step 5.

(Step 7) When the output brightness level data of the photoelectric transducer 1 surpasses the sum brightness level data added with the hysteresis value, the turn-on signal generated at Step 2 is stopped. Then, the process returns to Step 1.

In this way, the automatic lighting control device of the second embodiment using a one-chip microcomputer can be operated just same as the control device of the first embodiment.

(Another Embodiment)

In Step 4 of the second embodiment, when the memory stores the output level of the photoelectric transducer 1 corresponding to the sum brightness of daylight and lamp, the brightness may rise unusually caused by an incident light such as a car headlight. In that case, it may lapse into the malfunction state where the lamp cannot be switched off under the bright daylight if the memory stores such abnormal output level of the photoelectric transducer 1.

Then, when the memory stores the output level of the photoelectric transducer 1 corresponding to the sum brightness of daylight and lamp, two data are collected at the different time. If the difference between two collected data is small or none, the smaller data is stored in the memory.

If the difference between two collected data at difference time is large, the third data is collected at the third different time. The third data is compared with the previous smaller data. If the difference between two data is small or none, the smaller data is stored in the memory.

And, when a lamp cannot be switched on because of breakdown, the brightness level shown in Step 4 of the second embodiment does not rise at all. In this case, the warning of lamp exchange may be necessary to display by blinking LED and so on.

EXPLANATIONS OF REFERENCE NUMERALS

1 Photoelectric transducer
2 First comparator
3 Second memory
4 Timer
5 First memory
6 Adder
7 Third memory
8 Second comparator
10 One-chip microcomputer
11 Potentiometer
12 Output terminal for lighting signal
13 Amplifier
14 AD converter

The invention claimed is:

1. An automatic lighting control device comprising:
   a photoelectric transducer wherein a daylight detection field and a lamp illumination field are at least partially overlapped;
   a first comparator which generates a turn-on signal when an output level of the photoelectric transducer is lower than a predetermined light-up level;
   a memory which stores an output level data of the photoelectric transducer after light-up of the lamp;
   a second comparator which compares the output level of the photoelectric transducer with the post-light-up level stored in the memory and generates a turn-off signal when the output level of the photoelectric transducer is higher than the stored post-light-up output level data in the memory.

2. An automatic lighting control system which operates:
   an output level of the photoelectric transducer whose detection field for daylight is overlapped at least partially with an illumination field of a lamp is compared with a preset light-up level,
   the lamp is switched on when the output level of the photoelectric transducer lowers below the preset light-up level,
   a memory stores an output level data of the photoelectric transducer after light-up of the lamp,
   the output level of the photoelectric transducer is compared with the stored output level data in the memory after light-up of the lamp, and
   the lamp is switched off when the output level of the photoelectric transducer surpasses the stored post-light-up output level data in the memory.

* * * * *